(12) United States Patent
Ozawa et al.

(10) Patent No.: US 7,115,303 B2
(45) Date of Patent: Oct. 3, 2006

(54) PROCESS FOR PRODUCING SPHERICAL COMPOSITE CURED MELAMINE RESIN PARTICLES

(75) Inventors: Masaaki Ozawa, Nei-gun (JP); Akira Yoshida, Nei-gun (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 223 days.

(21) Appl. No.: 10/616,965

(22) Filed: Jul. 11, 2003

(65) Prior Publication Data

US 2004/0010114 A1  Jan. 15, 2004

Related U.S. Application Data

(63) Continuation-in-part of application No. PCT/JP02/01633, filed on Feb. 22, 2002.

(30) Foreign Application Priority Data

Mar. 2, 2001  (JP) .............................. 2001-057589

(51) Int. Cl.
*B05D 7/00* (2006.01)
(52) U.S. Cl. .................. 427/213.34; 427/215; 427/218
(58) Field of Classification Search ........... 427/213.34, 427/215, 218
See application file for complete search history.

(56) References Cited

U.S. PATENT DOCUMENTS

| 3,845,006 A | 10/1974 | Erneta |
| 3,846,453 A | 11/1974 | Erneta |
| 3,855,172 A * | 12/1974 | Iler et al. ..................... 523/223 |
| 4,069,176 A | 1/1978 | Tsubakimoto et al. |
| 5,322,915 A | 6/1994 | Weiser et al. |
| 5,998,573 A | 12/1999 | Takakura et al. |

FOREIGN PATENT DOCUMENTS

| DE | 197 52 420 A1 | 7/1999 |
| JP | A 50-45852 | 4/1975 |
| JP | A 50-151989 | 12/1975 |
| JP | A 52-16594 | 2/1977 |
| JP | A 9-143238 | 6/1977 |
| JP | A-57-123225 | 7/1982 |
| JP | A 62-10126 | 1/1987 |
| JP | A 62-68811 | 3/1987 |
| JP | A 4-175351 | 6/1992 |
| JP | A 5-202157 | 8/1993 |

OTHER PUBLICATIONS

Iler, "The Chemistry of Silica," John Wiley & Sons, Inc., 1979, p. 11.

* cited by examiner

Primary Examiner—Jeffrey Mullis
(74) Attorney, Agent, or Firm—Oliff & Berridge, PLC

(57) ABSTRACT

A process for producing spherical composite cured melamine resin particles excellent in water resistance, in which colloidal silica is localized near the surface thereof, comprising (a) a step of reacting a melamine compound with an aldehyde compound in an aqueous medium under a basic condition in the presence of a suspension of colloidal silica having an average particle size of 5 to 70 nm to produce an aqueous solution of a precondensate of water-soluble melamine resin; and (b) a step of adding an acid catalyst to the aqueous solution produced in the step (a) to separate out spherical composite cured melamine resin particles.

6 Claims, 2 Drawing Sheets

100nm

100nm

PROCESS FOR PRODUCING SPHERICAL COMPOSITE CURED MELAMINE RESIN PARTICLES

Figure 1:
Figure 2:
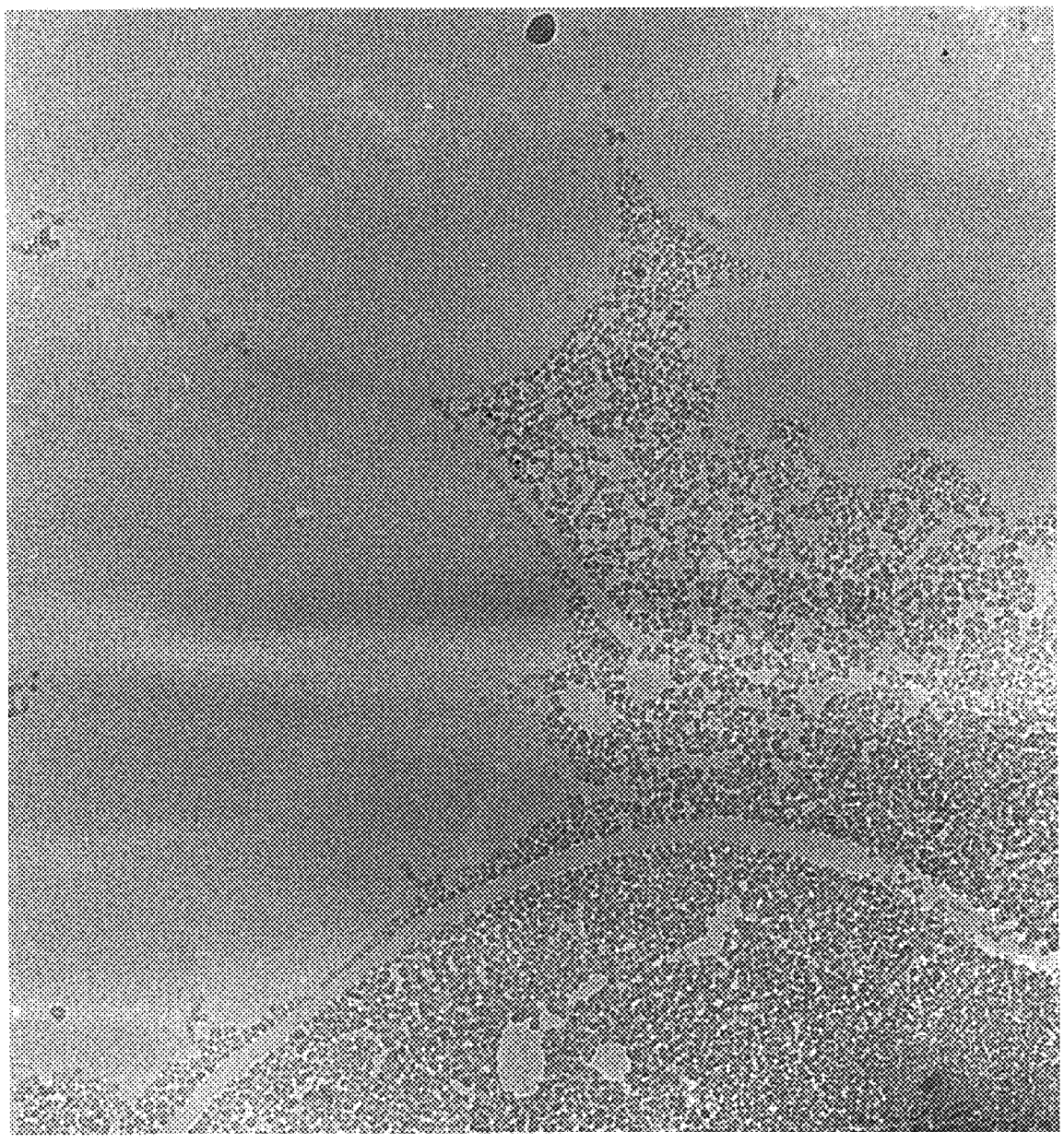

This is a continuation-in-part of international application No.PCT/JP02/01633, filed on Feb. 22, 2002.

BACKGROUND OF THE INVENTION

1. Field of the Art

The present invention relates to a process for producing spherical composite cured melamine resin particles in which colloidal silica is localized near the surface thereof. Further, the present invention relates to a process for producing the spherical composite cured melamine resin particles the surface of which is coated with inorganic compound particles. The spherical composite cured melamine resin particles of the present invention are particularly excellent in water resistance, and have good resistance to solvent attack, good heat resistance and a characteristic that the particles have a narrow particle size distribution. The particles are used suitably for several polishing agents, paints, ink, flatting agents, resin fillers, slipping improvement agents for resin films, column packings, anti-wearing agents, spacers for liquid crystal displays, light diffusion agents for light diffusion sheets, electrophoresis displays, hard coating agents for touch panels, toners, electrodes for solar cells, photocatalysts for decomposing water, optical materials, magnetic materials, electrically-conductive materials, flame retardants, paper-making materials, fiber-treating materials and the like.

2. Description of the Related Art

As methods for producing spherical cured melamine resin particles, several methods have been proposed. JP-A-50-45852 discloses a method comprising introducing a precondensate obtained by reacting benzoguanamine, melamine and formaldehyde in a given pH region into a hydrophilic polymer protective colloid under stirring to obtain an emulsion, adding a curing catalyst, such as an acid thereto and carrying out a curing reaction. In addition, JP-A-62-68811 discloses a method comprising condensing a hydrophilic precondensate of melamine and/or benzoguanamine and formaldehyde, and curing in the presence of a suspension of an alkylbenzenesulfonic acid having a $C_{10}$–$C_{18}$ alkyl group, in an aqueous solution containing an anionic or nonionic surfactant. These methods provide spherical cured melamine resin particles with a narrow particle size distribution. However, these methods have a problem that the water resistance of the resin particles is liable to be lowered because the resultant cured resin particles are contaminated by the water-soluble protective colloid and surfactants used as dispersants.

JP-A-52-16594 describes a method comprising adding fine particulate silica having a particle size of 0.05 μm or less and a curing catalyst to an emulsion of an uncured benzoguanamine resin colored with a dye, and curing the resulting mixture in a emulsified state. As the method uses a water-soluble protective colloid when the emulsion of benzoguanamine resin is synthesized, it has a problem that the water resistance of the resin particles is liable to be lowered as mentioned above. The fine particulate silica is used as a dispersion improvement agent in order to prevent agglomeration of cured benzoguanamine resin particles.

Also is proposed a method of producing spherical cured melamine resin particles with neither protective colloids nor surfactants. JP-A-50-151989 discloses a method of condensing a component to be condensed, which is selected from phenols, ureas and aromatic amines, with an aldehyde compound in an inert organic medium in the presence of a suspension of inorganic powders. The method uses an organic solvent as a reaction solvent, therefore it raises manufacturing cost, increases environmental burden and is not an economical method. JP-A-62-10126 describes a method of reacting melamine with an aldehyde compound in an aqueous medium in the presence of an emulsion of a basic catalyst and an essentially water-insoluble inorganic salt, such as calcium fluoride, magnesium fluoride or strontium fluoride. As the cured resin particles obtained by the method are coated with essentially water-insoluble inorganic salts, they have good water-resistance. However, the publication merely discloses cured resin particles having a particle size of about 10 μm in Example 1, and it does not disclose that particles having a particle size of submicron order are obtained. Therefore, the method has a problem in ranges of the control of particle size. Thus, it is desired to develop a method in which the particle size can be controlled in a broad range in order to extend the scope of use to which cured resin particles are applied.

U.S. Pat. No. 3,845,006 discloses a method comprising mixing and reacting an aqueous solution of polysilicic acid with an aqueous solution of aminoresin to produce polysilicic acid-aminoresin copolymer particles being spherical, and having holes and particle size of 1 to 50 μm. On the other hand, spherical composite cured melamine resin particles obtained by the present invention described below are different with particles described in the above-mentioned US Patent, in that in the present invention, colloidal silica and a melamine resin are not copolymerized uniformly, divided into phases and the resin particles are complicated as mosaic polymers.

In addition, the polysilicic acid is a highly hydrolyzed active silica having a molecular weight of 100,000 or less and particle size of less than 50 Å(5 nm). Colloidal silica has a molecular weight more than the polysilicic acid and particle size of 50 Å or more (see, Ralph K. Iler; The Chemistry of Silica, John Wiley & Sons, Inc, 1979, p. 11). Consequently, the polysilicic acid disclosed in the above-mentioned US Patent is different from the colloidal silica in the present invention.

U.S. Pat. No. 3,846,453 describes a method comprising mixing and reacting an aqueous solution of sodium silicate with an amino compound and formaldehyde to produce aminoresin-silica composite particles having primary particle size of 0.05 to 0.3 μm and cluster particle size of 1 to 10 μm. However, the method using the aqueous solution of sodium silicate does not produce composite particles stably in the test conducted by the present inventors (Comparative Example 3 of the present application).

As mentioned above, the conventional methods have problems that in case where a water-soluble surfactant is used when spherical cured melamine particles are synthesized, water resistance of the resulting resin particles is lowered, and that in case where an inorganic compound is used, it is difficult to control particle size of the resulting resin particles in broad ranges.

SUMMARY OF THE INVENTION

The object of the present invention is to provide spherical composite cured melamine resin particles in which colloidal silica is localized near the surface thereof and which are particularly excellent in water resistance. In addition, another object of the present invention is to provide a process for producing spherical composite cured melamine resin particles in which colloidal silica is localized near the surface thereof, wherein the process makes possible to control particle size thereof in broad ranges from a submicron to micron order. Further, an additional object of the present invention is to provide spherical composite cured melamine resin particles the surface of which is coated with inorganic compound particles, which are obtained by coating the surface of the spherical composite cured melamine resin particles with several inorganic compounds and which are applicable for a broad use; and a process for producing the same.

The present inventors found that spherical composite cured melamine resin particles are easily separated out by preparing an aqueous solution of a precondensate of a water-soluble melamine resin in an aqueous medium in which colloidal silica having an average particle size of 5 to 70 nm is present, adding an acid catalyst to the solution and then curing. Further, they found that particle size of spherical composite cured melamine resin particles can be controlled in broad ranges in the presence of a suspension of colloidal silica having an average particle size of 5 to 70 nm. And, the present invention has been completed on the basis of these findings.

The object of the present invention is achieved by the present invention described below. That is, the present invention relates to a process for producing spherical composite cured melamine resin particles comprising the following steps (a) and (b):

(a) a step of reacting a melamine compound with an aldehyde compound in an aqueous medium under a basic condition in the presence of a suspension of colloidal silica having an average particle size of 5 to 70 nm to produce an aqueous solution of a precondensate of water-soluble melamine resin; and (b) a step of adding an acid catalyst to the aqueous solution produced in the step (a) to separate out spherical composite cured melamine resin particles.

The spherical composite cured melamine resin particles produced by the above-mentioned process are characterized in that colloidal silica is localized near the surface of the spherical composite cured melamine resin particles and that the average particle size thereof ranges from 0.05 to 100 μm.

Although the reaction mechanism of colloidal silica in the production of the spherical composite cured melamine resin particles of the present invention is not clear, it is assumed that the colloidal silica may act as a surfactant through a hydrogen bond-like action between an amino group in the melamine resin and a silanol group present on the surface of the colloidal silica when cured melamine resin particles are separated out.

The spherical composite cured melamine resin particles produced by the present invention in which colloidal silica is localized near the surface thereof mean that the particles comprise spherical independent primary particles and have no holes and that the colloidal silica is localized in a depth of about 0.2 μm or less from the most external surface of the particles. The colloidal silica may be present in a state where it is embedded in the cured melamine resin near the surface of the particles or where it is adhered on the surface of the particles, and the component present on the most external surface of the particles is generally cured melamine resin. The morphology of the particles as mentioned above can be easily observed by e.g., photographs of slices of the spherical composite cured melamine resin particles with an electron microscope.

Further, the present invention relates to a process for producing spherical composite cured melamine resin particles comprising the following step (c):

(c) a step of mixing the spherical composite cured melamine resin particles produced in the step (b) with inorganic compound particles having an average particle size of one fifth (⅕) or less based on that of the spherical composite cured melamine resin particles directly or in an aqueous medium to coat the surface of the spherical composite cured melamine resin particles with the inorganic compound particles. To coat the surface of the particles with the inorganic compound particles means that the inorganic compound particles are adhered on the surface of the spherical composite cured melamine resin particles.

More further, the present invention relates to a process for producing spherical composite cured melamine resin particles comprising adding a water-soluble dyestuff in the step (a) and/or the step(b).

The present invention makes possible to produce spherical composite cured melamine resin particles characterized in that are particularly excellent in water resistance, and have good resistance to solvent attack, good heat resistance and a narrow particle size distribution, and in which colloidal silica is localized near the surface of the resin particles. In addition, the process for producing the particles according to the present invention makes possible to control particle size thereof in broad ranges from submicron to micron order. Further, the present invention can provide spherical cured melamine resin particles the surface of which is coated with inorganic compound particles. The spherical composite cured melamine resin particles are used suitably for several polishing agents, paints, ink, flatting agents, resin fillers, slipping improvement agents for resin films, column packings, anti-wearing agents, spacers for liquid crystal displays, light diffusion agents for light diffusion sheets, electrophoresis displays, hard coating agents for touch panels, toners, electrodes for solar cells, photocatalysts for decomposing water, optical materials, magnetic materials, electrically-conductive materials, flame retardants, paper-making materials, fiber-treating materials and the like.

DETAILED DESCRIPTION OF THE INVENTION

First of all, the step (a) of the present invention will be specifically described. The melamine compound used in the step (a) includes, for example melamine, substituted melamine compounds derived from melamine by replacement of a hydrogen of an amino group by an alkyl group, an alkenyl group or a phenyl group (see, U.S. Pat. No. 5,998,573 (the related Japanese patent: JP-A-9-143238)), and substituted melamine compounds derived from melamine by replacement of a hydrogen of an amino group by a hydroxyalkyl group, a hydroxyalkyl (oxalkyl)$_n$ group or an aminoalkyl group (see, U.S. Pat. No. 5,322,915 (the related Japanese patent: JP-A-5-202157)). Among them, melamine that is inexpensive is the most preferable.

The melamine compounds may be a mixture of a melamine compound and ureas such as urea, thiourea or ethylene urea, guanamines such as benzoguanamine or acetoguanamine, phenols such as phenol, cresol, alkylphenol, resorcin, hydroquinone or pyrogallol, or aniline.

The aldehyde compound includes, for example formaldehyde, paraformaldehyde, acetoaldehyde, benzaldehyde and furfural. Preferably, is formaldehyde or paraformaldehyde that is inexpensive and good in reactivity with the melamine compound. The aldehyde compound is preferably used in an amount corresponding to 1.1 to 6.0 mole, particularly 1.2 to 4.0 mole of effective aldehyde group based on 1 mole of the melamine compound.

As a medium used in the step (a) of the present invention, water is the most preferable. A mixed solution of water and water-soluble organic solvent may be used. In this case, it is suitable to use an organic solvent enabling a precondensate of melamine resin to dissolve therein. Preferable organic solvents include alcohols such as methanol, ethanol, isopropanol or propanol, ethers such as dioxane, tetrahydrofuran or 1,2-dimethoxyethane, polar solvents such as dimethylformamide or dimethylsulfoxide.

As the colloidal silica, ones having an average particle size of 5 to 70 nm are used.

In addition, the average particle size of the colloidal silica is a diameter based on specific surface area determined by nitrogen adsorption method (BET method). The average particle size (diameter based on specific surface area) (D nm) is determined by the equation: D=2720/S wherein S is a specific surface area ($m^2/g$). Powdery colloidal silica, such as precipitated silica powder or pyrogenic silica powder can be used. Preferably, it is suitable to use a sol of colloidal silica dispersed stably in a medium even in the level of primary particles. As a sol of colloidal silica, both an aqueous silica sol and an organo silica sol can be used. As an aqueous medium is used for the production of melamine resins, it is the most preferable to use an aqueous silica sol from the viewpoint of dispersion stability of a sol of colloidal silica. Sols of colloidal silica having a silica concentration of 5 to 50 wt % are generally on the market and easily available, therefore they are preferable.

When the average particle size of the colloidal silica is more than 70 nm, composite cured melamine resins separated out in the next step (b) become difficult to form spherical particles. As the concentration of melamine resin lowers or the average particle size of colloidal silica becomes small, the average particle size of spherical composite cured melamine resin particles generally tends to become small.

The amount of colloidal silica to be added is preferably 0.5 to 100 parts by weight, particularly 1 to 50 parts by weight based on 100 parts by weight of melamine compounds. If the amount is less than 0.5 part by weight, it becomes difficult to produce spherical composite cured melamine resin particles in the step (b). On the other hand, if the amount is more than 100 parts by weight, although spherical composite cured melamine resin particles are produced, non-spherical aggregation particles that are smaller than the spherical composite cured melamine resin particles are formed as a by-product, and therefore the amount is not preferable.

The reaction of a melamine compound with an aldehyde compound in the step (a) of the present invention is carried out under a basic condition. It is preferable to carry out the reaction by using a basic catalyst used for a general melamine compound and setting pH of the reaction solution to 7 to 10. As the basic catalyst, for example sodium hydroxide, potassium hydroxide or ammonia water can be used suitably. The reaction is generally carried out at a temperature of 50 to 80° C. Consequently, an aqueous solution of a precondensate of a water-soluble melamine resin having a molecular weight of ca. 200 to 700 is produced.

Next, the step (b) will be explained. The acid catalyst used in the step (b) is not specifically limited, and includes, for example hydrochloric acid, sulfuric acid, nitric acid or phosphoric acid, sulfonic acids such as methanesulfonic acid, benzenesulfonic acid, paratoluenesulfonic acid, alkylbenezenesulfonic acid or sulfamic acid, and organic acids such as formic acid, oxalic acid, benzoic acid or phthalic acid.

In the step (b), an acid catalyst is added to the aqueous solution of the precondensate produced in the step (a) and curing reaction is carried out. Generally, cured melamine resin particles are separated out in some minutes after the acid catalyst is added. The curing reaction is preferably carried out at a temperature of 70 to 100° C. by setting pH of the reaction solution to 3 to 7 with the acid catalyst.

The spherical composite cured melamine resin particles produced in the above-mentioned steps (a) and (b) in which colloidal silica is localized near the surface of the particles can be obtained as powdery particles by drying a solid mass after general filtration or centrifugation of the reaction solution, or by spray-drying directly a slurry in which resin particles are dispersed into water. In a case where the dried powdery particles are aggregated together, the aggregate can be separated without rupture of spherical particles by treating them with a mixing machine having shear force, such as a homomixer, Henschel mixer or Loedige mixer, or a mill, such as a pindisc mill, a pulverizer, inomizer or a counterjet mill.

The spherical composite cured melamine resin particles produced by the present invention have an average particle size of 0.05 to 100 μm. The average particle size (μm) of the spherical composite cured melamine resin particles is 50% volume diameter (median diameter) determined by laser diffraction and diffusion method based on Mie theory.

Next, the step (c) in which the surface of the spherical composite cured melamine resin particles is coated with inorganic compound particles will be described. As the inorganic compound particles, known ones, for example general metal particles or inorganic oxide particles can be used. The metal particles include, for example gold, silver, copper, iron, nickel, aluminum or zinc. The inorganic oxide particles include, for example silica, iron oxide, titanium oxide, zinc oxide, copper oxide, magnesium oxide, aluminum oxide, nickel oxide, cobalt oxide, antimony oxide, calcium oxide, cerium oxide, zirconium oxide, tin oxide, germanium oxide, vanadium oxide, manganese oxide, ruthenium oxide, lithium silicate or zinc antimonate anhydride. In addition, composite inorganic oxide particles composed of these inorganic oxide may be used.

The inorganic compound particles have preferably an average particle size of one fifth (⅕) or less based on that of the spherical composite cured melamine resin particles. It is preferable to have an average particle size of one tenth (¹⁄₁₀) or less. When the average particle size of the inorganic compound particles is more than one fifth based on that of the spherical composite cured melamine resin particles, it becomes difficult to coat the surface of the particles. Further, the smallest particle size of the inorganic compound particles is 5 nm that is the smallest particle size of colloidal particles.

The average particle size of the inorganic compound particles means 50% volume diameter (median diameter) determined by Laser diffraction and diffusion method based on Mie theory in case where it is 0.1 μm or more, while it means diameter based on specific surface area determined by nitrogen adsorption method (BET method) in case where it is less than 0.1 μm.

In order to coat the surface of the spherical composite cured melamine resin particles with inorganic compound particles, spherical composite cured melamine resin particles may be mixed with the inorganic compound particles directly or in an aqueous medium. Equipments for surface coating by direct mixing include, for example Mechanofusion AMS (trade name, produced by Hosokawamicron Co.), Hybridization System NHS (trade name, produced by Nara Machinery Co., Ltd.), Mechanomil New MM20 (trade name, produced by Okada Seiko Co.), Theta Composer (trade name, produced by Tokuju Corporation). In addition, general methods by evaporation, such as vacuum evaporation, sputtering or ion plating may be applied for surface coating with inorganic compound particles. Further, the surface coating by mixing in an aqueous medium can be carried out by mixing the spherical composite cured melamine resin particles with the inorganic compound particles in water, then separating into solid and liquid and drying. Preferably, the mixing temperature is 0 to 100° C., and the mixing time is 0.01 to 5 hours. In this case, the surface coating is carried out more effectively when inorganic compound particles having negative surface potential are used as melamine resins have basic amino groups. Further, the surface coating is carried out more effectively by using the inorganic compound particles in a state of an aqueous sol.

Next, the addition of a water-soluble dyestuff in the step (a) and/or the step (b) will be described. As the water-soluble dyestuffs known ones, for example general water-soluble acidic dyestuffs or water-soluble basic dyestuffs, especially water-soluble fluorescence dyestuffs such as water-soluble fluorescence dyestuffs or water-soluble fluorescence whitening dyestuffs, or water-soluble non-fluorescence dyestuffs can be used. The water-soluble fluorescence dyestuffs include, for example Uranine K (C.I. 45350), Basic Yellow 1 (C.I. 46025), Eosin Y (C.I. 45380), Eosin B (C.I. 45400), Rhodamine B (C.I. 45170), Brilliant Blue FCF (C.I. 42090), Brilliant Blue 6B (C.I. 24410), Acid Blue 92 (C.I. 13390), Naphthol Green B (C.I. 10020), Brilliant Green (C.I. 42040) or Alizarin Green (C.I. 42100). The water-soluble non-fluorescence dyestuffs include, for example Tartrazine (C.I. 19140), Metanil Yellow (C.I. 13065), New Coccin (C.I. 16255), Fast Red S (C.I. 15620), Acid Blue 41 (C.I. 62130), Acid Blue 45 (C.I. 63010), Indigo Carmine (C.I. 73015), Acid Green 3 (C.I. 42085), Acid Green 5 (C.I. 42095), Fast Green FCF (C.I. 42053) or Naphthol Blue Black (C.I. 20470).

The water-soluble dyestuff can be added in the step (a), the step (b), or the step (a) and step (b). If the water-soluble dyestuff is added in the step (b), it is preferable to be added it within 30 minutes after an appearance of turbidity. If the water-soluble dyestuff is added over 30 minutes after an appearance of turbidity in the step (b), it happens to produce incomplete colored melamine resin particles.

The amount of the water-soluble dyestuff to be added is preferably 0.01 to 20 parts by weight, particularly 0.05 to 10 parts by weight based on 100 parts by weight of melamine compounds. If the amount is less than 0.01 parts by weight, it becomes difficult to produce composite colored cured melamine resin particles in the step (b). On the other hand, if the amount is more than 20 parts by weight, gelatinization of the precondensate easily occurs, and therefore it becomes difficult to produce composite colored cured melamine resin particles in the step (b).

The water-soluble dyestuff also can be added with a UV absorbent in the step (a), the step (b), or the step (a) and step (b).

EXAMPLES

Hereinafter, the present invention will be described in more detail on the basis of examples and comparative examples.

Example 1

A 2-L reaction flask equipped with a mechanical stirrer, a reflux condenser and a thermometer was charged with 50.0 g of melamine, 96.5 g of 37% formalin, 26.7 g of aqueous silica sol (Snowtex S (trade name) produced by Nissan Chemical Industries, Ltd.: $SiO_2$ concentration of 30.5 wt %, pH 10.0, average particle size of 7.9 nm) and 720 g of water, and the mixture was adjusted to pH 8.5 with 25% ammonia water. Then, the mixture was raised in temperature with stirring, kept at 70° C. and reacted for 30 minutes to prepare an aqueous solution of a precondensate of melamine resin. The molecular weight of the melamine resin was 280 at this stage by gel permeation chromatography (GPC method) (calculated from polystyrene). Next, while the temperature was kept at 70° C., the resulting aqueous solution of precondensate was adjusted to pH 7.0 by adding 10 wt % aqueous solution of dodecylbenzenesulfonic acid. After about 20 minutes, white turbidity appeared in the reaction system and cured melamine resin particles were separated out. Then, the mixture was raised to a temperature of 90° C. and curing reaction was carried out for 3 hours. After cooling, the resulting reactant solution was filtered and dried to produce white cured resin particles. The average particle size of the resulting particles was measured with a laser diffraction and diffusion particle size distribution measuring apparatus (Mastersizer 2000 (trade name) produced by Malvern Co.) and was consequently 0.24 µm. The cured melamine resin particles were observed as such with a scanning electron microscope (SEM) and observed also in state of slice with Transmission Electron Microscope—Energy Depressive X-ray Analysis (TEM-EDX). As a result of them, it was confirmed that the particles were spherical and that colloidal silica was localized near the surface thereof.

Example 2

A 2-L reaction flask equipped with a mechanical stirrer, a reflux condenser and a thermometer was charged with 50.0 g of melamine, 96.5 g of 37% formalin, 40.1 g of aqueous silica sol (Snowtex N (trade name) produced by Nissan Chemical Industries, Ltd.: $SiO_2$ concentration of 20.3 wt %, pH 9.5, average particle size of 12.0 nm) and 720 g of water, and the mixture was adjusted to pH 8.5 with 25% ammonia water. Then, the mixture was raised in temperature with stirring, kept at 70° C. and reacted for 30 minutes to prepare an aqueous solution of a precondensate of melamine resin. The molecular weight of the melamine resin was 280 at this stage by GPC method (calculated from polystyrene). Next, while the temperature was kept at 70° C., the resulting aqueous solution of precondensate was adjusted to pH 6.0 by adding 10 wt % aqueous solution of dodecylbenzenesulfonic acid. After about 5 minutes, white turbidity appeared in the reaction system and cured melamine resin particles were separated out. Then, the mixture was raised to a temperature of 90° C. and curing reaction was carried out for 3 hours. After cooling, the resulting reactant solution was filtered and dried to produce white cured melamine resin particles. The average particle size of the resulting particles was measured with a laser diffraction and diffusion particle size distribution measuring apparatus and was consequently 0.93 µm. The cured melamine resin particles were observed as such with SEM and observed also in state of slice with TEM-EDX. As a result of them, it was confirmed that the particles were spherical and that colloidal silica was localized near the surface thereof.

Example 3

A 2-L reaction flask equipped with a mechanical stirrer, a reflux condenser and a thermometer was charged with 100 g of melamine, 193 g of 37% formalin, 15.5 g of aqueous silica sol (Snowtex N (trade name) produced by Nissan Chemical Industries, Ltd.: $SiO_2$ concentration of 20.3 wt %, pH 9.5, average particle size of 12.0 nm) and 614 g of water, and the mixture was adjusted to pH 8.0 with 25% ammonia water. Then, the mixture was raised in temperature with stirring, kept at 70° C. and reacted for 30 minutes to prepare an aqueous solution of a precondensate of melamine resin. The molecular weight of the melamine resin was 310 at this stage by GPC method (calculated from polystyrene). Next, while the temperature was kept at 70° C., the resulting aqueous solution of precondensate was adjusted to pH 5.5 by adding 10 wt % aqueous solution of paratoluenesulfonic acid monohydrate. After about 2 minutes, white turbidity appeared in the reaction system and cured melamine resin particles were separated out. Then, the mixture was raised to a temperature of 90° C. and curing reaction was carried out for 3 hours. After cooling, the resulting reactant solution was filtered, dried and pulverized with a pindisk mill to produce white cured melamine resin particles. The average particle size of the resulting particles was measured with a laser diffraction and diffusion particle size distribution measuring apparatus and was consequently 6.5 μm. The cured melamine resin particles were observed as such with SEM and observed also in state of slice with TEM-EDX. As a result of them, it was confirmed that the particles were spherical and that colloidal silica was localized near the surface thereof.

Example 4

A 2-L reaction flask equipped with a mechanical stirrer and a thermometer was charged with 200 g of cured melamine resin particles produced in Example 3, 22.6 g of aqueous silica sol (Snowtex N (trade name) produced by Nissan Chemical Industries, Ltd.: $SiO_2$ concentration of 20.3 wt %, pH 9.5, average particle size of 12.0 nm) and 1230 g of water, and the mixture was adjusted to pH 5.0 with paratoluenesulfonic acid. After stirring the mixture as such at a room temperature for 1 hour, filtrating and drying, the particles were obtained. The resulting particles were observed as such with SEM and observed also in state of slice with TEM-EDX. As a result of them, it was confirmed that the particles were spherical and that the surface thereof was coated with silica.

Example 5

A 2-L reaction flask equipped with a mechanical stirrer and a thermometer was charged with 200 g of cured melamine resin particles produced in Example 3, 17.9 g of aqueous diantimony pentoxide sol (A-1550 (trade name) produced by Nissan Chemical Industries, Ltd.: $Sb_2O_5$ concentration of 49.2 wt %, pH 5.9, average particle size of 80 nm) and 1230 g of water, and the mixture was adjusted to pH 5.0 with paratoluenesulfonic acid. After stirring the mixture as such at a room temperature for 1 hour, filtrating and drying, the particles were obtained. The resulting particles were observed as such with SEM and observed also in state of slice with TEM-EDX. As a result of them, it was confirmed that the particles were spherical and that the surface thereof was coated with diantimony pentoxide.

Comparative Example 1

The procedures in Example 1 were repeated except that colloidal silica was not used. The resulting reactant solution was filtered and dried to produce cured resin powders. The average particle size of the resulting powders was measured with a laser diffraction and diffusion particle size distribution measuring apparatus and was consequently 88 μm. The powders did not form spherical cured melamine resin particles by observation with SEM.

Comparative Example 2

The procedures in Example 1 were repeated except that 66.8 g of aqueous silica sol (Snowtex ZL (trade name) produced by Nissan Chemical Industries, Ltd.: $SiO_2$ concentration of 40.5 wt %, pH 9.8, average particle size of 80 nm) was used. The resulting reactant solution was filtered and dried to produce cured resin powders. The average particle size of the resulting powders was measured with a laser diffraction and diffusion particle size distribution measuring apparatus and was consequently 38 μm. The powders did not form spherical cured melamine resin particles by observation with SEM.

Comparative Example 3

A 2-L reaction flask equipped with a mechanical stirrer, a reflux condenser and a thermometer was charged with 100 g of melamine, 193 g of 37% formalin, 10.6 g of an aqueous solution of sodium silicate ($SiO_2$ concentration of 29.2 wt %, molar ratio of $SiO_2/Na_2O$: 3.22) and 619 g of water, and the mixture was adjusted to pH 8.0. Then, the mixture was raised in temperature with stirring, kept at 70° C. and reacted for 30 minutes to prepare an aqueous solution of a precondensate of melamine resin. The molecular weight of the melamine resin was 310 at this stage by GPC method (calculated from polystyrene). Next, while the temperature was kept at 70° C., the resulting aqueous solution of precondensate was adjusted to pH 5.5 by adding 10 wt % aqueous solution of paratoluenesulfonic acid monohydrate. White turbidity appeared in the reaction system after about 5 minutes. The reaction were continued as such, and melamine resins in the reaction system were totally gelled and became a solid mass for about 15 minutes. As a result of it, the mechanical stirrer was put in torque-up state, and therefore the reaction was stopped. Consequently, this example did not afford spherical cured melamine particles.

Example 6

A 2-L reaction flask equipped with a mechanical stirrer, a reflux condenser and a thermometer was charged with 50.0 g of melamine, 96.5 g of 37% formalin, 40.1 g of aqueous silica sol (Snowtex N (trade name) produced by Nissan Chemical Industries, Ltd.: $SiO_2$ concentration of 20.3 wt %, pH 9.5, average particle size of 12.0 nm), 0.68 g of Uranine K as a water-soluble dyestuff and 720 g of water, and the mixture was adjusted to pH 8.5 with 25% ammonia water. Then, the mixture was raised in temperature with stirring, kept at 70° C. and reacted for 30 minutes to prepare an aqueous yellow solution of a precondensate of melamine resin. The molecular weight of the melamine resin was 280 at this stage by GPC method (calculated from polystyrene). Next, while the temperature was kept at 70° C., the resulting aqueous solution of precondensate was adjusted to pH 6.0 by adding 10 wt % aqueous solution of dodecylbenzenesulfonic acid. After about 3 minutes, turbidity appeared in the reaction system and yellow cured melamine resin particles were separated out. Then, the mixture was raised to a temperature of 90° C. and curing reaction was carried out for 3 hours. After cooling, the resulting reactant solution was filtered and dried to produce yellow cured melamine resin particles. The average particle size of the resulting particles was measured with a laser diffraction and diffusion particle size distribution measuring apparatus and was consequently 0.30 μm. The cured melamine resin particles were observed as such with SEM and observed also in state of slice with TEM-EDX. As a result of them, it was confirmed that the particles were spherical and that colloidal silica was localized near the surface thereof.

Example 7

A 2-L reaction flask equipped with a mechanical stirrer, a reflux condenser and a thermometer was charged with 100 g of melamine, 193 g of 37% formalin, 15.5 g of aqueous silica sol (Snowtex N (trade name) produced by Nissan Chemical Industries, Ltd.: $SiO_2$ concentration of 20.3 wt %, pH 9.5, average particle size of 12.0 nm), 2.2 g of Eosin Y as a water-soluble dyestuff and 614 g of water, and the mixture was adjusted to pH 8.0 with 25% ammonia water. Then, the mixture was raised in temperature with stirring, kept at 70° C. and reacted for 30 minutes to prepare an aqueous red solution of a precondensate of melamine resin. The molecular weight of the melamine resin was 310 at this stage by GPC method (calculated from polystyrene). Next, while the temperature was kept at 70° C., the resulting aqueous solution of precondensate was adjusted to pH 5.5 by adding 10 wt % aqueous solution of paratoluenesulfonic acid monohydrate. After about 3 minutes, turbidity appeared in the reaction system and red cured melamine resin particles were separated out. Then, the mixture was raised to a temperature of 90° C. and curing reaction was carried out for 3 hours. After cooling, the resulting reactant solution was filtered, dried and pulverized with a pindisk mill to produce red cured melamine resin particles. The average particle size of the resulting particles was measured with a laser diffraction and diffusion particle size distribution measuring apparatus and was consequently 7.1 μm. The cured melamine resin particles were observed as such with SEM and observed also in state of slice with TEM-EDX. As a result of them, it was confirmed that the particles were spherical and that colloidal silica was localized near the surface thereof.

Example 8

A 2-L reaction flask equipped with a mechanical stirrer, a reflux condenser and a thermometer was charged with 100 g of melamine, 193 g of 37% formalin, 15.5 g of aqueous silica sol (Snowtex N (trade name) produced by Nissan Chemical Industries, Ltd.: $SiO_2$ concentration of 20.3 wt %, pH 9.5, average particle size of 12.0 nm) and 614 g of water, and the mixture was adjusted to pH 8.0 with 25% ammonia water. Then, the mixture was raised in temperature with stirring, kept at 70° C. and reacted for 30 minutes to prepare an aqueous red solution of a precondensate of melamine resin. The molecular weight of the melamine resin was 310 at this stage by GPC method (calculated from polystyrene). Next, while the temperature was kept at 70° C., the resulting aqueous solution of precondensate was adjusted to pH 5.5 by adding 10 wt % aqueous solution of paratoluenesulfonic acid monohydrate. After about 2 minutes, white turbidity appeared in the reaction system and cured melamine resin particles were separated out. After about 5 minutes, the reaction flask was charged with 34 g of 0.5 wt % aqueous solution of Rhodamine B. Then, the mixture was raised to a temperature of 90° C. and curing reaction was carried out for 3 hours. After cooling, the resulting reactant solution was filtered, dried and pulverized with a pindisk mill to produce magenta cured melamine resin particles. The average particle size of the resulting particles was measured with a laser diffraction and diffusion particle size distribution measuring apparatus and was consequently 6.8 μm. The cured melamine resin particles were observed as such with SEM and observed also in state of slice with TEM-EDX. As a result of them, it was confirmed that the particles were spherical and that colloidal silica was localized near the surface thereof.

Example 9

A 2-L reaction flask equipped with a mechanical stirrer, a reflux condenser and a thermometer was charged with 100 g of melamine, 193 g of 37% formalin, 15.5 g of aqueous silica sol (Snowtex N (trade name) produced by Nissan Chemical Industries, Ltd.: $SiO_2$ concentration of 20.3 wt %, pH 9.5, average particle size of 12.0 nm), 2.2 g of Eosine Y as a water-soluble dyestuff, 0.7 g of UV absorbent (SEESORB101S (trade name) produced by Shipro Kasei Kaisha, Ltd.) and 614 g of water, and the mixture was adjusted to pH 8.0 with 25% ammonia water. Then, the mixture was raised in temperature with stirring, kept at 70° C. and reacted for 30 minutes to prepare an aqueous red solution of a precondensate of melamine resin. The molecular weight of the melamine resin was 300 at this stage by GPC method (calculated from polystyrene). Next, while the temperature was kept at 70° C., the resulting aqueous solution of precondensate was adjusted to pH 5.5 by adding 10 wt % aqueous solution of paratoluenesulfonic acid monohydrate. After about 3 minutes, turbidity appeared in the reaction system and red cured melamine resin particles were separated out. Then, the mixture was raised to a temperature of 90° C. and curing reaction was carried out for 3 hours. After cooling, the resulting reactant solution was filtered, dried and pulverized with a pindisk mill to produce red cured melamine resin particles. The average particle size of the resulting particles was measured with a laser diffraction and diffusion particle size distribution measuring apparatus and was consequently 8.2 μm. The cured melamine resin particles were observed as such with SEM and observed also in state of slice with TEM-EDX. As a result of them, it was confirmed that the particles were spherical and that colloidal silica was localized near the surface thereof.

Example 10

A 2-L reaction flask equipped with a mechanical stirrer, a reflux condenser and a thermometer was charged with 100 g of melamine, 193 g of 37% formalin, 15.5 g of aqueous silica sol (Snowtex N (trade name) produced by Nissan Chemical Industries, Ltd.: $SiO_2$ concentration of 20.3 wt %, pH 9.5, average particle size of 12.0 nm), 1.3 g of Naphthol Blue Black as a water-soluble dyestuff and 614 g of water, and the mixture was adjusted to pH 8.0 with 25% ammonia water. Then, the mixture was raised in temperature with stirring, kept at 70° C. and reacted for 30 minutes to prepare an aqueous navy blue solution of a precondensate of melamine resin. The molecular weight of the melamine resin was 310 at this stage by GPC method (calculated from polystyrene). Next, while the temperature was kept at 70° C., the resulting aqueous solution of precondensate was adjusted to pH 5.5 by adding 10 wt % aqueous solution of paratoluenesulfonic acid monohydrate. After about 4 minutes, turbidity appeared in the reaction system and navy blue cured melamine resin particles were separated out. Then, the mixture was raised to a temperature of 90° C. and curing reaction was carried out for 3 hours. After cooling, the resulting reactant solution was filtered, dried and pulverized with a pindisk mill to produce navy blue cured melamine resin particles. The average particle size of the resulting particles was measured with a laser diffraction and diffusion particle size distribution measuring apparatus and was consequently 7.1 μm. The cured melamine resin particles were observed as such with SEM and observed also in state of slice with TEM-EDX. As a result of them, it was confirmed that the particles were spherical and that colloidal silica was localized near the surface thereof.

Example 11

A 2-L reaction flask equipped with a mechanical stirrer, a reflux condenser and a thermometer was charged with 100 g of melamine, 193 g of 37% formalin, 15.5 g of aqueous silica sol (Snowtex N (trade name) produced by Nissan Chemical Industries, Ltd.: $SiO_2$ concentration of 20.3 wt %, pH 9.5, average particle size of 12.0 nm), 1.1 g of Naphthol Blue Black as a water-soluble dyestuff, 0.5 g of UV absorbent (SEESORB101S (trade name) produced by Shipro Kasei Kaisha, Ltd.) and 614 g of water, and the mixture was adjusted to pH 8.0 with 25% ammonia water. Then, the mixture was raised in temperature with stirring, kept at 70° C. and reacted for 30 minutes to prepare an aqueous navy blue solution of a precondensate of melamine resin. The molecular weight of the melamine resin was 310 at this stage by GPC method (calculated from polystyrene). Next, while the temperature was kept at 70° C., the resulting aqueous solution of precondensate was adjusted to pH 5.5 by adding 10 wt % aqueous solution of paratoluenesulfonic acid monohydrate. After about 4 minutes, turbidity appeared in the reaction system and navy blue cured melamine resin particles were separated out. Then, the mixture was raised to a temperature of 90° C. and curing reaction was carried out for 3 hours. After cooling, the resulting reactant solution was filtered, dried and pulverized with a pindisk mill to produce navy blue cured melamine resin particles. The average particle size of the resulting particles was measured with a laser diffraction and diffusion particle size distribution measuring apparatus and was consequently 7.9 μm. The cured melamine resin particles were observed as such with SEM and observed also in state of slice with TEM-EDX. As a result of them, it was confirmed that the particles were spherical and that colloidal silica was localized near the surface thereof.

What is claimed is:

1. A process for producing spherical composite cured melamine resin particles, comprising:
    reacting a melamine compound with an aldehyde compound in an aqueous medium under a basic condition in the presence of a suspension of colloidal silica having an average particle size of 5 to 70 nm to produce an aqueous solution of a precondensate of water-soluble melamine resin;
    adding an acid catalyst to the aqueous solution to separate out spherical composite cured melamine resin particles; and
    mixing the spherical composite cured melamine resin particles with inorganic compound particles directly or in an aqueous medium to coat the surface of the spherical composite cured melamine resin particles with the inorganic compound particles;
    wherein the inorganic compound particles have an average particle size of one fifth (⅕) or less based on an average particle size of the spherical composite cured melamine resin particles.

2. The process for producing spherical composite cured melamine resin particles according to claim 1, wherein the colloidal silica is present in an amount of 0.5 to 100 parts by weight based on 100 parts by weight of the melamine compound.

3. The process for producing spherical composite cured melamine resin particles according to claim 1, wherein an aqueous silica sol is used as the colloidal silica.

4. A process for producing spherical composite cured melamine resin particles, comprising:
    reacting a melamine compound with an aldehyde compound in an aqueous medium under a basic condition in the presence of a suspension of colloidal silica having an average particle size of 5 to 70 nm to produce an aqueous solution of a precondensate of water-soluble melamine resin; and
    adding an acid catalyst to the aqueous solution to separate out spherical composite cured melamine resin particles;
    wherein a water-soluble dyestuff is added during at least one of
    reacting the melamine compound with the aldehyde compound; and
    adding the acid catalyst to the aqueous solution.

5. The process for producing spherical composite cured melamine resin particles according to claim 4, wherein the colloidal silica is present in an amount of 0.5 to 100 parts by weight based on 100 parts by weight of the melamine compound.

6. The process for producing spherical composite cured melamine resin particles according to claim 4, wherein an aqueous silica sol is used as the colloidal silica.

* * * * *